United States Patent
Coon

(10) Patent No.: US 8,857,103 B1
(45) Date of Patent: Oct. 14, 2014

(54) PLANTER WITH ADJUSTABLE SUPPORT STAKES

(76) Inventor: Kelley G. Coon, Pleasant Hill, OR (US)

( * ) Notice: Subject to any disclaimer, the term of this patent is extended or adjusted under 35 U.S.C. 154(b) by 26 days.

(21) Appl. No.: 13/595,077

(22) Filed: Aug. 27, 2012

(51) Int. Cl.
*A01G 9/12* (2006.01)

(52) U.S. Cl.
USPC .......................... 47/70; 47/45; 47/79

(58) Field of Classification Search
USPC .............. 47/65.5, 70, 79, 44, 45, 46, 47
IPC ................... A01G 9/12,17/04, 17/06
See application file for complete search history.

(56) References Cited

U.S. PATENT DOCUMENTS

| | | | | |
|---|---|---|---|---|
| 597,841 | A * | 1/1898 | Dolf | 47/47 |
| 2,030,249 | A * | 2/1936 | Goldberg | 47/44 |
| 2,406,439 | A * | 8/1946 | Pratt, Sr. | 47/79 |
| 3,026,649 | A * | 3/1962 | Barakauskas | 47/70 |
| 3,076,289 | A * | 2/1963 | Gallo | 47/83 |
| 3,238,671 | A * | 3/1966 | Binyon | 47/70 |
| 4,841,670 | A * | 6/1989 | Bitter | 47/47 |
| 4,869,018 | A | 9/1989 | Scales et al. | |
| 4,914,857 | A * | 4/1990 | Dodgen | 47/47 |
| D346,098 | S | 4/1994 | Schweiker, Jr. | |
| 5,327,678 | A * | 7/1994 | Schweiker | 47/70 |
| 5,345,714 | A * | 9/1994 | Washington | 47/70 |
| 5,357,710 | A | 10/1994 | Dulik et al. | |
| 5,711,107 | A * | 1/1998 | Louisiana | 47/45 |
| 6,299,125 | B1 | 10/2001 | Zayeratabat | |
| 6,370,820 | B1 * | 4/2002 | Moss | 47/81 |
| 8,166,704 | B1 * | 5/2012 | Sydlowski | 47/48.5 |
| 8,567,120 | B2 * | 10/2013 | Davis et al. | 47/44 |
| 2006/0283082 | A1 * | 12/2006 | Stevenson, III | 47/70 |
| 2010/0101144 | A1 * | 4/2010 | Kurtz | 47/66.7 |
| 2011/0197505 | A1 * | 8/2011 | Hansen | 47/65.8 |

FOREIGN PATENT DOCUMENTS

| | | | | |
|---|---|---|---|---|
| CH | 614346 | A5 * | 11/1979 | A01G 9/02 |
| JP | 2000060312 | A * | 2/2000 | A01G 9/02 |
| JP | 2006000107 | A * | 1/2006 | |

* cited by examiner

*Primary Examiner* — Shadi Baniani
(74) *Attorney, Agent, or Firm* — Crossley Patent Law; Micah C. Gunn

(57) ABSTRACT

A planter with adjustable support stakes to support a growing houseplant, including a pot and length adjustable stakes each of which include at least one section rod having a bottom end inserted into a receptacle within a pot upper end and couplers which to vertically attach section rods together and a length of string attached to directly opposite couplers to prevent plant breakage and to support fruit produced by the houseplant.

1 Claim, 5 Drawing Sheets

PLANTER WITH ADJUSTABLE SUPPORT STAKES

BACKGROUND OF THE INVENTION

Figure 1:
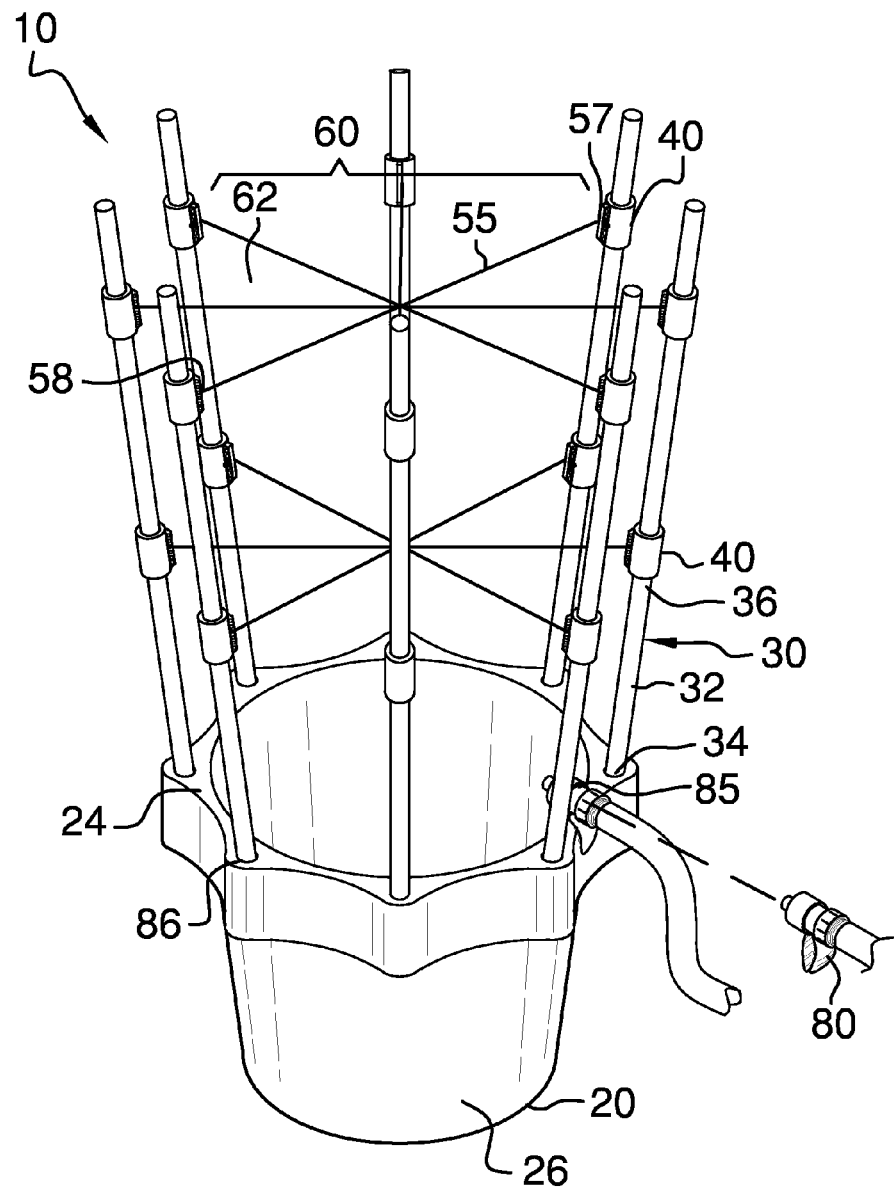

Various types of plant support devices are known in the prior art. However, what is needed is a planter with adjustable support stakes to support a growing houseplant, including a pot and stakes each of which include at least one section rod having a bottom end inserted into a receptacle within a pot upper end and couplers to vertically attach section rods together and a further including length of string attached to directly opposite couplers to prevent plant breakage and to support fruit produced by the houseplant.

FIELD OF THE INVENTION

The present invention relates to houseplant pots, and more particularly, to a planter with length adjustable support stakes.

SUMMARY OF THE INVENTION

The general purpose of the present planter with adjustable support stakes, described subsequently in greater detail, is to provide a planter with adjustable support stakes which has many novel features that result in a planter with adjustable support stakes which is not anticipated, rendered obvious, suggested, or even implied by prior art, either alone or in combination thereof.

To accomplish this, the present planter with adjustable support stakes includes a pot configured to hold a houseplant, such as a vine, a palm, or a tomato plant, therein. A plurality of spaced-apart receptacles is centrally disposed along an upper edge of the pot. At least one pair of the receptacles is disposed in a position parallel to a side of the pot with one of the pair of receptacles disposed on an opposite side of the pot from the other one of the pair of receptacles. At least one of the receptacles is disposed at a slight angle to a side of the pot. A plurality of spaced-apart stakes is provided to support the houseplant growing in the pot. Each stake has at least one section rod which, in turn, has a bottom end and a top end. Each receptacle removably receives a bottom end of one of the section rods therein. Each receptacle has a length slightly shorter than a length of the upper edge in order to provide greater stability to the stakes than if the receptacle were shorter.

Couplers are provided to attach section rods together to lengthen each stake. Each coupler has a continuous outer wall and a cavity vertically disposed therethrough having a diameter slightly larger than a diameter of the section rod. Each coupler cavity removably secures a top end of one of the section rods and a bottom end of an adjacent one of the section rods disposed in vertical alignment therewith. The length adjustability of each stake accommodates the growth of a plant with additional section rods utilized as the plant's height increases. An anchor member is disposed on the coupler outer wall in a position perpendicular to the outer wall and has a plurality of apertures horizontally disposed therethrough. A length of string is continuously disposed between anchor members disposed on opposite sides of the pot. The opposite ends of each length of string are attached through the apertures of directly opposite anchor members.

Upon the attachment of a length of string to all oppositely disposed anchor members, a webbing having openings therein is formed to permit a plant to grow therethrough while providing support to the plant and any fruit grown by the plant, thus preventing breakage of the plant limbs and damage to the fruit.

Spaced-apart drain holes are disposed in a bottom wall of the pot to permit drainage of water therefrom and to prevent water from stagnating in the pot and the growth of mold thereby encouraging houseplant growth. A clamp is removably disposed on the upper edge of the pot. The clamp is configured to receive a water sprayer therethrough to provide water to a plant contained in the pot. In addition, the upper edge of the pot has spaced apart protrusions in which one of the receptacles is disposed. The protrusions assist is balancing the pot in an upright, stable position.

The stakes and couplers can be cylindrical as illustrated. Each receptacle has a diameter configured to receive a bottom end of one of the rods therein. The diameter size of the rods is configured to collectively support a plant growing within a pot; therefore, rods having a diameter in a range of approximately one-quarter to one-half inch are utilized for some smaller plants, while rods having a larger diameter, for example of three-quarter inch, are utilized for larger plants. The present apparatus can also be modified to increase the number of receptacles and stakes to accommodate different sizes and types of plants.

The present apparatus avoids damage to a plant's root system by providing adjustable stakes that attach to a planter pot that do not come into contact with a plant's roots thereby either destroying or stunting the growth of the plant rather than either utilizing stakes that are shoved into the soil adjacent to the plant or utilizing a non-adjustable metal cage that surrounds the planter pot. The webbing, which is height adjustable, supports a plant as the plant grows and supports the fruit of a plant that bears fruit thereby preventing vines or branches of the plant from breaking and also preventing deterioration of the fruit that may otherwise occur when the fruit comes into contact with the underlying soil as the fruit weighs down the plant.

Thus has been broadly outlined the more important features of the present planter with adjustable support stakes so that the detailed description thereof that follows may be better understood and in order that the present contribution to the art may be better appreciated.

BRIEF DESCRIPTION OF THE DRAWINGS FIGURES

Figure 2:
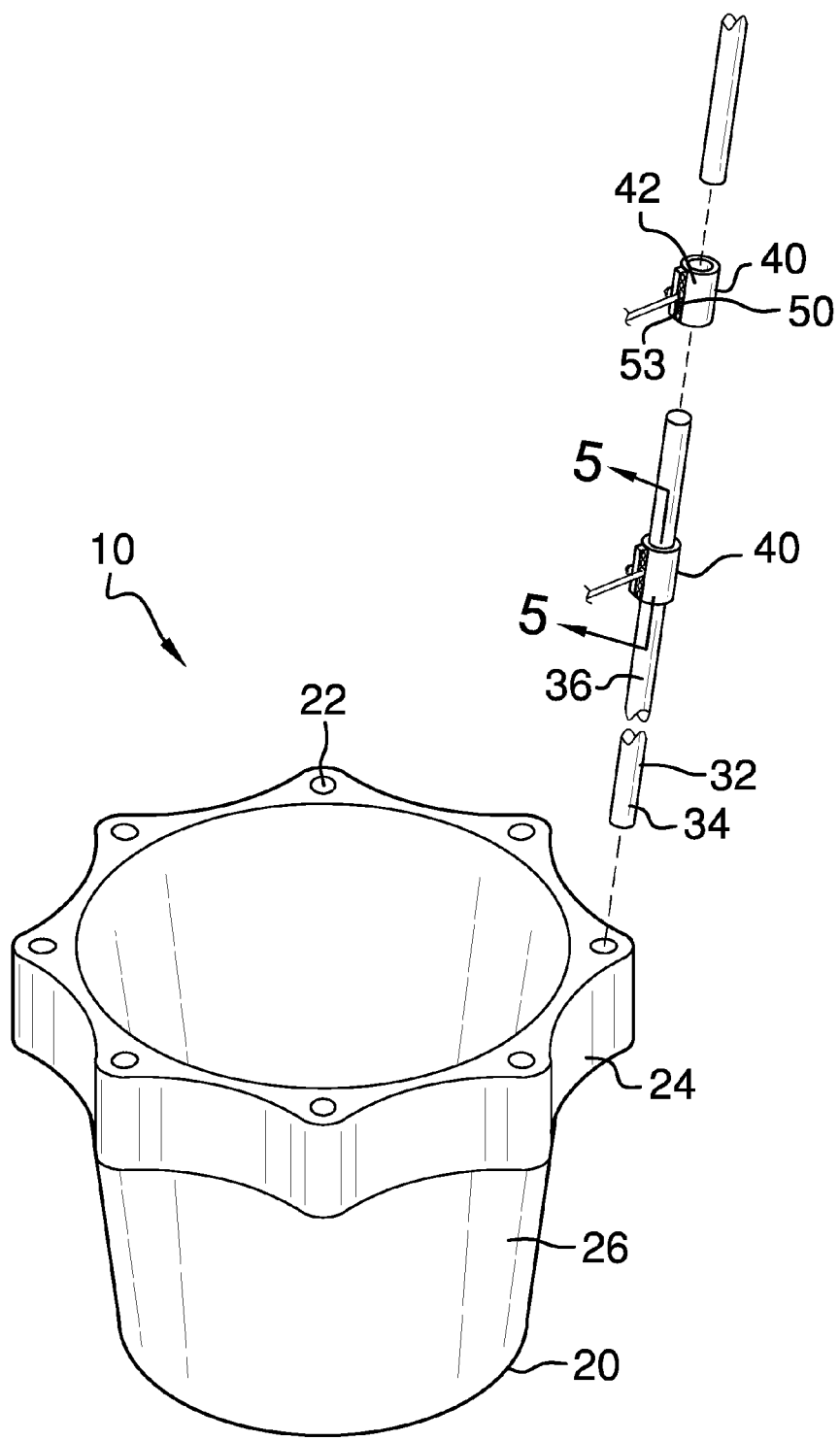
Figure 3:
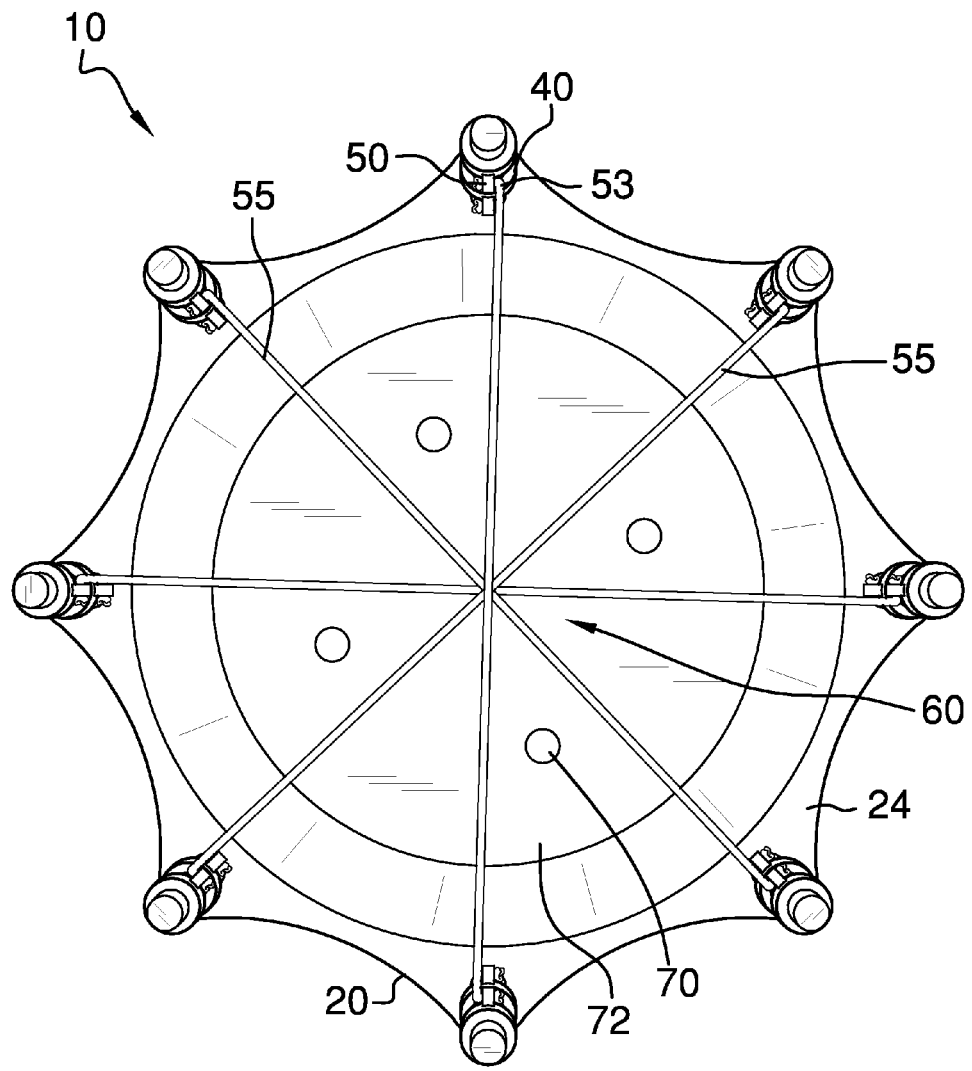
Figure 4:
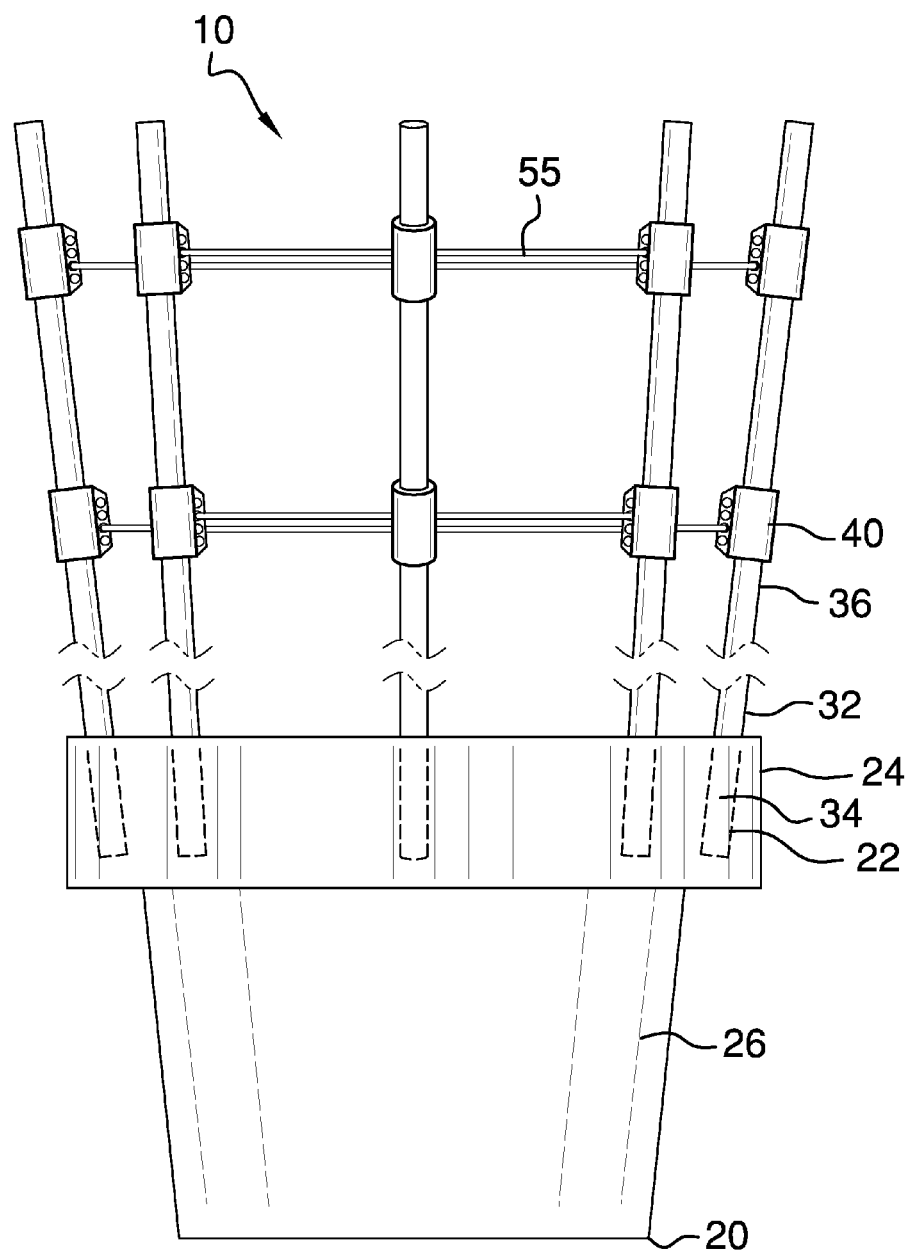
Figure 5:
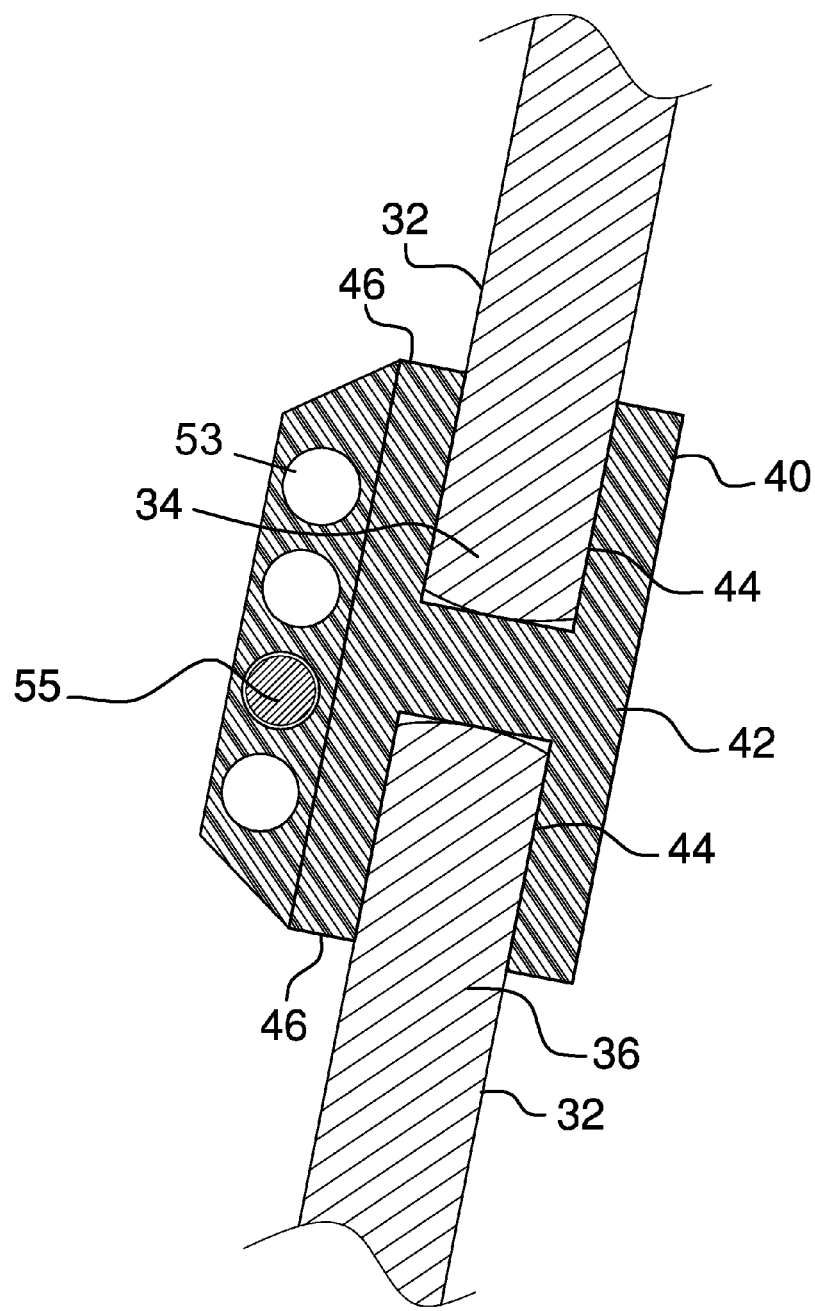

FIG. 1 is an isometric view.
FIG. 2 is an exploded view.
FIG. 3 is a top plan view.
FIG. 4 is a side elevation view.
FIG. 5 is a cross-sectional view taken along line 5-5 of FIG. 2.

DETAILED DESCRIPTION OF THE DRAWINGS

With reference now to the drawings, and in particular FIGS. 1 through 5 thereof, example of the instant planter with adjustable support stakes employing the principles and concepts of the present planter with adjustable support stakes and generally designated by the reference number 10 will be described.

Referring to FIGS. 1 through 5 a preferred embodiment of the present planter with adjustable support stakes 10 is illustrated. The planter with adjustable support stakes 10 includes a pot 20 configured to hold a houseplant therein. A plurality of spaced-apart receptacles 22 is centrally disposed along an upper edge 24 of the pot 20. At least one pair of the receptacles is disposed in a position parallel to a side wall 26 of the pot 20 with one of the pair of receptacles 22 disposed on an opposite side of the pot 20 from the other one of the pair of receptacles 22. At least one pair of the receptacles 22 is disposed at a slight outward angle from one of the receptacles 22 disposed in parallel position.

The present apparatus 10 also includes a plurality of spaced-apart stakes 30. Each stake 30 includes at least one section rod 32. Each section rod 32 has a bottom end 34 and a top end 36. Each receptacle 22 removably receives a bottom end 34 of one of the section rods 32 therein.

A plurality of couplers 40 is included in the present apparatus 10. Each coupler 40 has a continuous outer wall 42 and a pair of cavity 44 vertically disposed therethrough with one of the cavities 44 disposed through each of an opposite outer end 46 thereof. Each cavity 44 has a diameter slightly larger than a diameter of the section rod. Each coupler 40 removably secures a top end 36 of one of the section rods 32 and a bottom end 34 of an adjacent one of the section rods 32 disposed in vertical alignment therewith. Each stake 30 is, therefore, adjustable lengthwise by coupling additional section rods 32 together with couplers 40. The length adjustability of each stake 30 accommodates the growth of a houseplant with additional section rods 32 utilized as the houseplant's height increases.

An anchor member 50 is disposed on the coupler 40 outer wall 42 in a position perpendicular to the outer wall 42. A plurality of vertically aligned apertures 53 in a position perpendicular to the respective stake 30 is provided. Each aperture 53 is horizontally disposed through the anchor member 50.

A length of string 55 is continuously disposed between anchor members 50 disposed on opposite sides of the pot 20. Each length of string 55 has a first end 57 and a second end 58 opposite the first end 57. The first end 57 is attached through one of the apertures 53 disposed on one of the anchor members 50 while the second end 58 is attached through one of the apertures 53 disposed on a directly opposite one of the anchor members. Upon the attachment of a length of string 55 to all directly oppositely disposed anchor members 50, a webbing 60 having openings 62 therein is formed to permit a houseplant to grow therethrough while providing support to the houseplant and any fruit grown by the houseplant, thus preventing breakage of the houseplant limbs and damage to the fruit.

A plurality of spaced-apart drain holes 70 are disposed in a bottom wall 72 of the pot to permit drainage of water therefrom. The drain holes 70 help prevent water from stagnating in the pot and mold.

A clamp 80 is removably disposed on the upper edge 24 of the pot 20. The clamp 80 is configured to receive a water sprayer 85, such as a water mister, therethrough to provide water to a houseplant contained in the pot 20.

Each receptacle 22 has a length slightly shorter than a length of the upper edge 24 in order to provide greater stability to the stakes 30 than if the receptacle were shorter.

In addition, the upper edge 24 of the pot 20 has spaced apart protrusions 86. One of the receptacles 22 is disposed in each of the protrusions 86. The protrusions 86 assist is balancing the pot in an upright, stable position.

The stakes 30 and couplers 40 can be cylindrical as illustrated. Each receptacle 22 has a diameter configured to receive a bottom end 34 of one of the section rods 32 therein. The diameter size of the section rods 32 is configured to collectively support a houseplant growing within a pot 20; therefore, section rods 32 having a diameter in a range of approximately one-quarter to one-half inch are utilized for some smaller houseplants, while section rods 32 having a larger diameter, for example of three-quarter inch, are utilized for larger houseplants. The present apparatus 10 can also be modified to increase the number of receptacles 22 and stakes 30 to accommodate different sizes and types of houseplants.

What is claimed is:

1. A planter with adjustable support stakes consisting of:
   a pot configured to hold a houseplant therein;
   a plurality of spaced-apart receptacles centrally disposed along an upper edge of the pot;
   wherein at least one pair of the receptacles is disposed in a position parallel to a side wall of the pot, further wherein one of the pair of receptacles disposed on an opposite side of the pot from the other one of the pair of receptacles;
   wherein at least one pair of the receptacles is disposed at a slight outward angle from one of the receptacles disposed in the parallel position;
   a plurality of spaced-apart stakes, each stake comprising:
      a plurality of section rods, each section rod having a bottom end and a top end;
      a plurality of couplers, each coupler having a continuous outer wall and a pair of cavities vertically disposed therethrough; wherein one of the cavities is disposed through each of an opposite outer end thereof;
   of the pair of cavities has a diameter slightly larger than a diameter of each of the plurality of section rods;
   of the plurality of couplers removably secures a top end of each of the plurality of section rods and a bottom end of each of the plurality of section rods disposed in vertical alignment therewith;
   of the plurality of receptacles removably receives a bottom end plurality of section rods therein;
   a plurality of anchor members, each of the plurality of anchor members disposed on each coupler outer wall in a position perpendicular to the outer wall;
   a plurality of vertically aligned apertures in a position parallel to the respective stake, of the plurality of apertures horizontally disposed through each anchor member of the plurality of anchor members;
   a plurality of strings disposed between the plurality of anchor members, and disposed on opposite sides of the pot;
   wherein each string of the plurality of strings has a first end and a second end opposite the first end;
   wherein of each string is attached through one of the apertures disposed on one of the anchor members and the second end is attached through one of the apertures disposed on a directly opposite one of the anchor members;
   wherein each receptacle of the plurality of receptacles has a length slightly shorter than a length of the upper edge of the pot; and
   wherein each of the plurality of spaced-apart stakes and the plurality of couplers is cylindrical;
   wherein the plurality of strings form a webbing having openings upon attachment of the plurality of strings to all directly oppositely disposed the plurality of anchor members;
   a plurality of spaced-apart drain holes disposed in a bottom wall of the pot; and
   a clamp removably disposed on the upper edge of the pot;
   wherein the clamp is configured to receive a water sprayer therethrough.

* * * * *